Feb. 20, 1934.    J. D. WARREN    1,948,147
CONFECTION MOLD
Filed March 7, 1932    2 Sheets-Sheet 1

INVENTOR
JOHN D. WARREN
BY
ATTORNEY

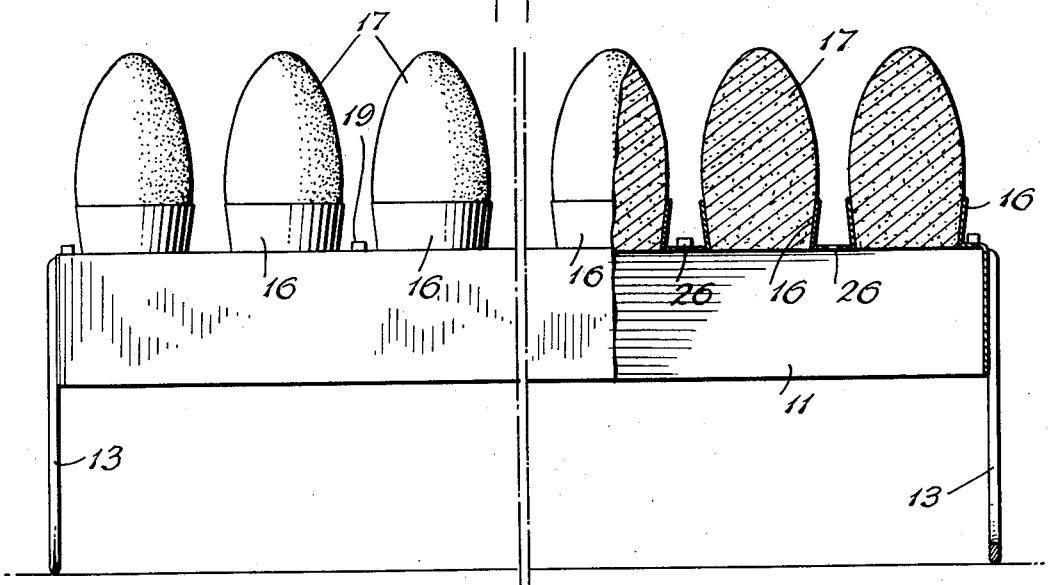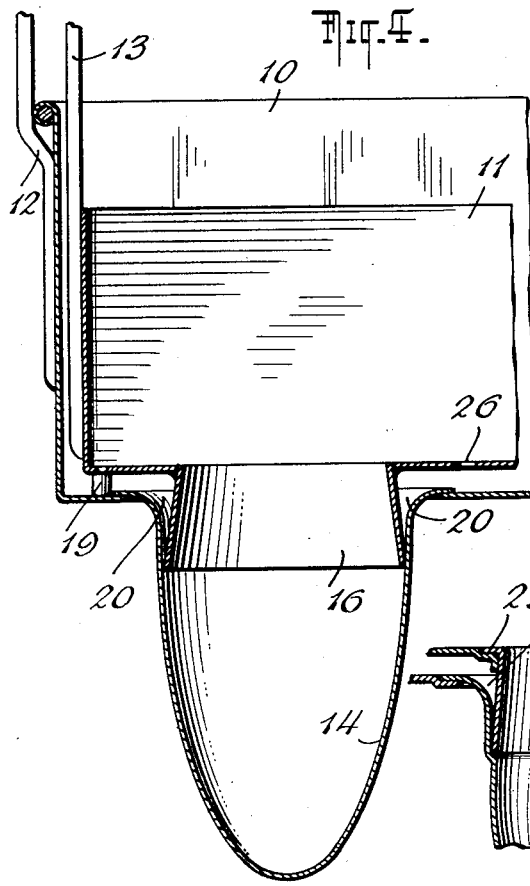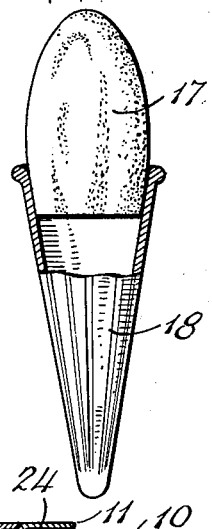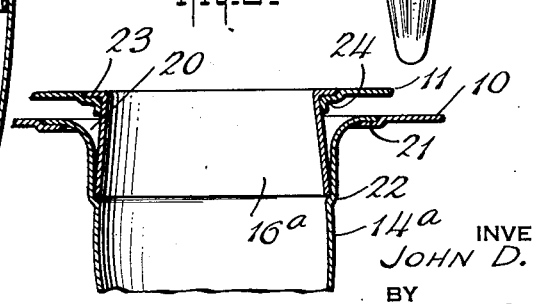

Patented Feb. 20, 1934

1,948,147

UNITED STATES PATENT OFFICE 1,948,147

CONFECTION MOLD

John D. Warren, New York, N. Y.

Application March 7, 1932. Serial No. 597,182

4 Claims. (Cl. 107—19)

This invention relates to improvements in molds, and has particular reference to an apparatus for molding confections such as ice cream, frozen ices and the like.

In the well known practice of dispensing ice cream in cones, a hand mold or disher is employed to scoop the confection from a container and then deposit the same into the cones. It has been found that this method not only entails the loss of a very considerable quantity of the confection, due to its adherence to the mold and the expelling of air from the confection as it is compressed in the mold, but also the fills which are discharged from the scoop into the cones are not quantitatively uniform.

These difficulties are overcome in the present invention by providing a mold of simple and unique construction in which a plurality of cone fills may be separately molded, frozen and then removed and packed ready for distribution.

A feature of the invention consists in providing each of two separable members of the apparatus with a mold section which cooperates with the section of the other member to form the molded article, one of said sections being of a construction which will produce a tapered end on said article to permit of its easy insertion into a cone wherein it is supported.

The inventive idea involved is capable of receiving a variety of mechanical expressions, some of which, for purposes of illustration, are shown in the accompanying drawings wherein:—

Figure 3 is a side elevation, partly in section, of the inner mold member illustrating the position in which it is placed after being withdrawn from the outer mold member and preparatory to removing the fills from engagement with the mold sections of said inner member.

Figure 4 is an enlarged fragmentary section of the separable mold members and a pair of the cooperating mold sections carried thereby.

Figure 5 is a view similar to Figure 4 illustrating a preferred and slightly different form of assembly of the mold sections with their respective members, and Figure 6 is an elevation, partly in section, showing one of the fills, made in the mold illustrated in Fig. 5, inserted into a cone.

Figure 1:
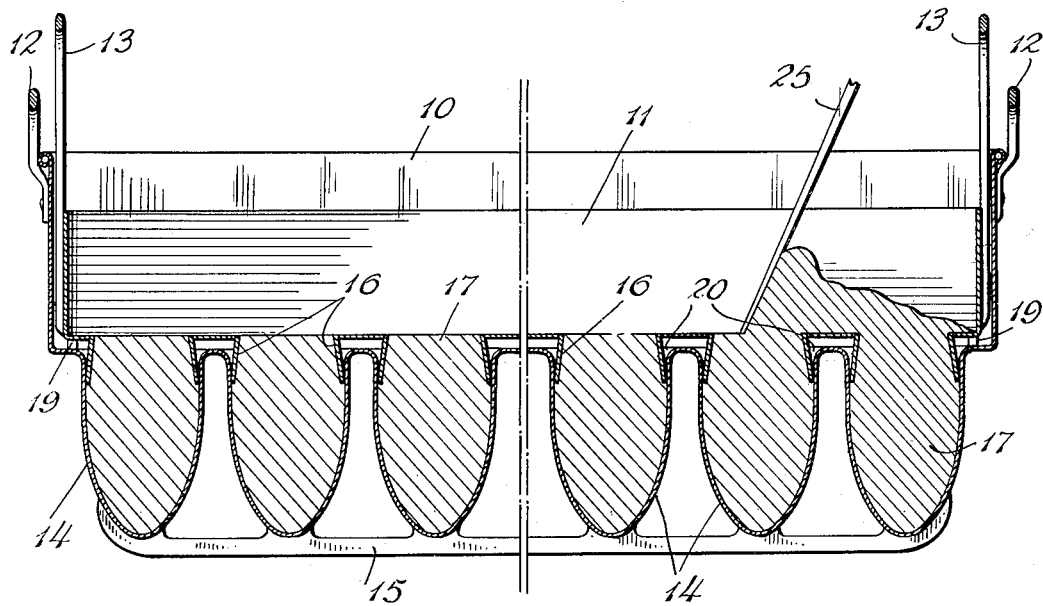
Figure 1 is a vertical longitudinal section through the mold apparatus illustrating the manner of filling the cooperating mold sections.
Figure 2:
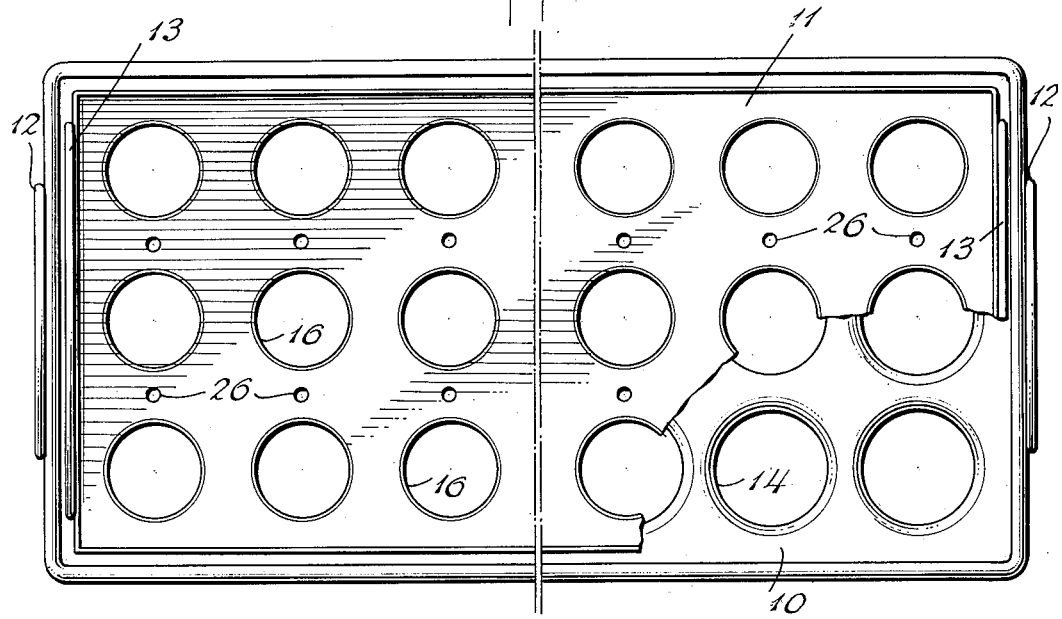
Figure 2 is a top plan view of the apparatus partly broken away.

Specifically the apparatus is shown as comprising the outer and inner separable mold members 10 and 11 respectively which are of tray-like formation and adapted to be nested one within the other when in cooperative relation. Substantially U-shaped handles 12 and 13 are provided upon the ends of the outer and inner members respectively for the purpose of facilitating the handling of the members, the handles 13 of the member 11 being utilized to support said member in an inverted position after the same has been extracted from the member 10, as shown in Figure 3.

The bottom of the outer member 10 has depending therefrom a series of mold sections 14 of any desired configuration and preferably arranged in rows extending longitudinally of the member 10, the sections in each row being connected at their lower free ends by braces 15.

The bottom of the member 11 is likewise provided with a series of mold sections 16 which depend therefrom and extend into the upper open ends of the sections 14 so as to cooperate therewith in the molding of a complete article or fill 17. In the manufacture of a fill which is subsequently to be inserted into a cone 18, such as shown in Figure 6, it is desirable that the end of the fill which is to be fitted into said cone be tapered so that it can be easily fitted into the latter and supported in the open end thereof while the fill is being eaten. For this purpose, each of the sections 16 is of frusto-conical form with the wall thereof diverging downwardly when the members 10 and 11 are in cooperative position, the bottoms of said members being at this time spaced from each other by supports 19 arranged at intervals on the member 11 and engaging the bottom of the member 10. By thus constructing the sections 16 and spacing the bottoms of the members 10 and 11, it will be apparent that only the lower free edge of each section 16 will intimately contact the wall of the associated section 14 adjacent its open end and further that there will be formed between each pair of sections in the adjacent portion of the members 10 and 11 an air space 20, the purpose of which will appear in the course of the description. With the section 16 engaged within the section 14, as illustrated in Figure 4, it will be apparent that when a confection such as ice cream is poured into the mold sections and thereafter frozen the lower edge of the section 16 will form an annular shoulder about the fill 17 which, when the latter is inserted into the cones 18, will rest upon the rim of said cone and thereby provide an additional support for the fill.

In Figure 5 a slightly different form of assembly of the mold sections is illustrated. In this modification the mold section 14a has its upper flared end seated in a recess 21 formed in the bottom of the member 10 and said section is also crimped adjacent its upper end as indicated at 22 to provide an annular shoulder upon which the lower free edge of the mold section 16a is seated whereby the walls of the mold sections will present a smooth inner surface. The section 16a is also provided at its upper end with an annular flange 23 which is seated in a recess 24 in the bottom of the section 11 so that said bottom will also present a smooth unbroken upper surface which will facilitate the scraping and cleansing operations incident to molding the fill 17.

In practice, the members 10 and 11 are first brought into cooperative relation, as shown in Figure 1, and the confection, in a semi-frozen state, is then poured into the member 11 so as to flow down into and fill the mold sections 14 and 16. An implement such as a scraper 25 is then utilized to remove the excess ice cream within the member 11. Thereupon the apparatus is inserted into a freezing solution the level of which should extend above the bottom of the inner member 11. When the fills are completely frozen the apparatus is extracted from the freezing solution and then placed in tepid water which circulates about the various sections 14 so as to soften the outer surface of each fill 17 sufficiently to permit its easy withdrawal from the section 14 when the inner member 11 is lifted from the member 10 by means of the handles 13. During this latter operation, the temperature of the tepid water will be insufficient, owing to the air spaces 20, to soften the portions of the fills 17 surrounded by the sections 16 to such an extent that they will become detached from said sections when the member 11 is withdrawn from the member 10. Therefore, when this is done the fill 17 will adhere to the sections 16 and after the member 11 has been completely withdrawn the same is inverted, as shown in Figure 3, and again immersed in tepid water to a level sufficient to raise the temperature of the base of each fill so that it may be withdrawn from its section 16. Openings 26 are provided in the bottom of the member 11 between the various sections 16 for the purpose of providing air vents which will permit the escape of air from the member 11 after the lower portion thereof has been immersed in the tepid water, thereby preventing the formation of an air pocket within said member.

In extracting the fills 17 from the sections 16 suitable wrappers such as glassine paper may be utilized and the fill thereafter completely inclosed within said wrapper so that it may be conveniently packed for storage and distribution.

What is claimed is:

1. In an apparatus for molding confections or the like, separable tray-like mold members nested one within the other, and a mold section depending from each member and cooperating with the section on the other member to mold a complete article, one of said sections extending into the other when the mold members are in cooperative relation and there being an air space between said sections when the same are so positioned which will encircle said article.

2. In an apparatus for molding confections or the like, separable tray-like mold members capable of being nested one within the other, a series of mold sections depending from the bottom of the outer member, and a series of other mold sections of frusto-conical formation carried by the inner member and extending into the first named sections with only an edge of each of said other sections in contact with its associated section of the first named series, the remaining portions of said sections being separated to form an air space therebetween.

3. In an apparatus for molding confections or the like, separable mold members capable of being nested one within the other, a series of mold sections on the outer mold member, and a series of other mold sections on the inner mold member and extending into the first-named sections with only an edge of each of said other sections in contact with its associated section of the first-named series, the remaining portion of each of said other sections being spaced from its associated section to form an air gap therebetween.

4. In an apparatus for molding confections or the like, separable tray-like mold members nested one within the other with the bottoms of the members in spaced relation, and a mold section extending from the bottom of each member and cooperating with the section on the other member to mold a complete article, one of said sections extending into the other and combining therewith and with the bottoms of said mold members to form an air space which partially surrounds a portion of the article being molded.

JOHN D. WARREN.